(12) United States Patent
Niv et al.

(10) Patent No.: US 7,499,216 B2
(45) Date of Patent: Mar. 3, 2009

(54) WIDE FIELD-OF-VIEW BINOCULAR DEVICE

(75) Inventors: Yehuda Niv, Nes Ziona (IL); Uzia Nivon, Moshav Kidron (IL); Tal Cohen, Herzlia (IL)

(73) Assignee: Mirage Innovations Ltd., Petach-Tikva (IL)

( * ) Notice: Subject to any disclaimer, the term of this patent is extended or adjusted under 35 U.S.C. 154(b) by 3 days.

(21) Appl. No.: 10/896,865

(22) Filed: Jul. 23, 2004

(65) Prior Publication Data

US 2006/0018019 A1    Jan. 26, 2006

(51) Int. Cl.
G02B 27/44    (2006.01)

(52) U.S. Cl. .................................. 359/566; 359/630

(58) Field of Classification Search ................ 359/34, 359/35, 15, 407, 630, 566
See application file for complete search history.

(56) References Cited

U.S. PATENT DOCUMENTS

| | | |
|---|---|---|
| 4,410,237 A | 10/1983 | Veldkamp |
| 4,441,974 A | 4/1984 | Nishikawa et al. |
| 4,711,512 A | 12/1987 | Upatnieks |
| 4,805,988 A | 2/1989 | Dones |
| 4,931,158 A | 6/1990 | Bunshah et al. |
| 5,082,629 A | 1/1992 | Burgess et al. |
| 5,224,198 A | 6/1993 | Jachimowicz et al. |
| 5,237,451 A | 8/1993 | Saxe |
| 5,441,570 A | 8/1995 | Hwang |
| 5,469,185 A | 11/1995 | Lebby et al. |
| 5,503,875 A | 4/1996 | Imai et al. |
| 5,682,255 A | 10/1997 | Friesem et al. |
| 5,693,197 A | 12/1997 | Lal et al. |
| 5,742,262 A | 4/1998 | Tabata et al. |
| 5,761,177 A | 6/1998 | Muneyoshi et al. |
| 5,835,661 A | 11/1998 | Tai et al. |
| 5,966,223 A | 10/1999 | Friesen et al. |
| 6,008,941 A | 12/1999 | Feldman et al. |
| 6,197,486 B1 | 3/2001 | Majumdar et al. |
| 6,207,361 B1 | 3/2001 | Greener et al. |
| 6,436,619 B1 | 8/2002 | Majumdar et al. |
| 6,465,140 B1 | 10/2002 | Majumdar et al. |
| 6,492,269 B1 | 12/2002 | Liu et al. |

(Continued)

FOREIGN PATENT DOCUMENTS

EP    1031870    8/2000

(Continued)

OTHER PUBLICATIONS

Anonymous "Graphic CIE L*a*b* Calculator. Try the Color Metric Converter or the RGB Calculator", Applet, ColorEng Inc., Retrieved From the Internet: <URL:http://colorpro.com/info/tools/labcalc.htm>, 4 P., 2007.

(Continued)

*Primary Examiner*—Audrey Y Chang

(57) ABSTRACT

A binocular device for transmitting an image into the eyes is provided. The binocular device comprises a first monocular device, for providing one eye with a first asymmetric field-of-view, and a second monocular device for providing another eye with a second asymmetric field-of-view, where the first and second asymmetric field-of-views are mutually complementary to a combined field-of-view, wider than each individual asymmetric field-of-view.

24 Claims, 3 Drawing Sheets

U.S. PATENT DOCUMENTS

| | | | |
|---|---|---|---|
| 6,566,033 | B1 | 5/2003 | Majumdar et al. |
| 6,570,172 | B2 | 5/2003 | Kim et al. |
| 6,580,529 | B1 | 6/2003 | Amitai et al. |
| 6,611,385 | B2 | 8/2003 | Song |
| 6,638,409 | B1 | 10/2003 | Huang et al. |
| 6,757,105 | B2 | 6/2004 | Niv et al. |
| 6,787,463 | B2 | 9/2004 | Mardian et al. |
| 6,805,490 | B2 | 10/2004 | Levola |
| 6,822,770 | B1 | 11/2004 | Takeyama |
| 6,833,955 | B2 | 12/2004 | Niv |
| 6,882,479 | B2 * | 4/2005 | Song et al. .............. 359/630 |
| 7,206,107 | B2 | 4/2007 | Levola |
| 2002/0041734 | A1 | 4/2002 | Worchesky et al. |
| 2002/0122015 | A1 | 9/2002 | Song et al. |
| 2002/0158131 | A1 | 10/2002 | Dickson et al. |
| 2003/0030596 | A1 | 2/2003 | Park |
| 2003/0040509 | A1 | 2/2003 | Moskowitz |
| 2003/0067685 | A1 | 4/2003 | Niv |
| 2003/0165017 | A1 | 9/2003 | Amitai |
| 2003/0202247 | A1 | 10/2003 | Niv et al. |
| 2004/0004767 | A1 * | 1/2004 | Song ........................ 359/566 |
| 2004/0051957 | A1 | 3/2004 | Liang |
| 2004/0062502 | A1 | 4/2004 | Levola |
| 2005/0201693 | A1 | 9/2005 | Korenaga et al. |
| 2006/0056028 | A1 | 3/2006 | Wildnauer |
| 2006/0126179 | A1 | 6/2006 | Levola |
| 2006/0221448 | A1 | 10/2006 | Nivon et al. |

FOREIGN PATENT DOCUMENTS

| | | |
|---|---|---|
| EP | 1215522 | 6/2002 |
| EP | 1333308 | 8/2003 |
| EP | 1577872 | 9/2005 |
| GB | 2 021 803 A * | 12/1979 |
| JP | 04-097201 | 3/1992 |
| JP | 5-249383 | 9/1993 |
| JP | 06-230225 | 8/1994 |
| JP | 06-250022 | 9/1994 |
| JP | 2000-056259 | 2/2000 |
| WO | WO 95/11473 | 4/1995 |
| WO | WO99/52002 | 10/1999 |
| WO | WO 01/95027 | 12/2001 |
| WO | WO 03/032017 | 4/2003 |
| WO | WO 03/091763 | 11/2003 |
| WO | WO 2007/031991 | 3/2007 |
| WO | WO 2007/031992 | 3/2007 |
| WO | WO 2007/052265 | 5/2007 |
| WO | WO 2007/138576 | 12/2007 |
| WO | WO 2008/020450 | 2/2008 |

OTHER PUBLICATIONS

Anonymous "TOPAS®: Thermoplastic Olefin Polymer of Amorphous Structure (COC). Cyclic Olefin Copolymer (COC)", Polyplastics, Retrieved From the Internet: URL:http://www.polyplastics.com/en/product/lines/topas/TOPAS.pdf, p. 1-7, 2008. Fig.3.

Sung et al. "Analog Micro-Optics Fabrication by Use of A Binary Phase Grating Mask", Micromachining Technology for Micro-Optics and Nano-Optics II, Proceedings of the SPIE, 5347(1): 62-70, 2004.

Thirstrup et al. "Diffractive Optical Coupling Element for Surface Plasmon Resonance Sensors", Sensors and Actuators B, 100(3):298-308, 2004. p. 300-302, Figs.2b, 2c.

Shechter et al. "Compact Beam Expander With Linear Gratings", Dept. of Physics of Complex Systems, Weizman Institute of Science,: 1-24.

Eriksson et al. "Highly Directional Grating Outcouplers with Tailorable Radiation Characterisitics", IEEE Journal of Quantum Electronics, 32(6): 1038-1047, 1996. p. 1038, col. 2, Par. 2, Fig. 3,6,7.

Wiesmann et al. "Apodized Surface-Corrugatd gratingss with Varying Duty Cycles", IEEE Photonics Technology Letters,12(6): 639-641, 2000. p. 640-641, fig. 1,2.

??? "NanoPrism Technology", Online web.archive.org/web/20050811031919/www.mirageinnovtions.com/main_technology.htm. Abstract.

* cited by examiner

WIDE FIELD-OF-VIEW BINOCULAR DEVICE

FIELD AND BACKGROUND OF THE INVENTION

The present invention relates to an optical device and, more particularly, to a binocular device having a wide field-of-view which is capable of providing monochrome or multicolor images.

Miniaturization of electronic devices has always been a continuing objective in the field of electronics. Electronic devices are often equipped with some form of a display, which is visible to a user. As these devices reduce in size, there is an increase need for manufacturing compact displays, which are compatible with small size electronic devices. Besides having small dimensions, such displays should not sacrifice image quality, and be available at low cost. By definition the above characteristics are conflicting and many attempts have been made to provide some balanced solution.

An electronic display may provide a real image, the size of which is determined by the physical size of the display device, or a virtual image, the size of which may extend the dimensions of the display device.

A real image is defined as an image, projected on or displayed by a viewing surface positioned at the location of the image, and observed by an unaided human eye (to the extent that the viewer does not require corrective glasses). Examples of real image displays include a cathode ray tube (CRT), a liquid crystal display (LCD), an organic light emitting diode array (OLED), or any screen-projected displays. A real image could be viewed normally from a distance of about at least 25 cm, the minimal distance at which the human eye can utilize focus onto an object. Unless a person is long-sighted, he may not be able to view a sharp image at a closer distance.

Typically, desktop computer systems and workplace computing equipment utilize CRT display screens to display images for a user. The CRT displays are heavy, bulky and not easily miniaturized. For a laptop, a notebook, or a palm computer, flat-panel display is typically used. The flat-panel display may use LCD technology implemented as passive matrix or active matrix panel. The passive matrix LCD panel consists of a grid of horizontal and vertical wires. Each intersection of the grid constitutes a single pixel, and controls an LCD element. The LCD element either allows light through or blocks the light. The active matrix panel uses a transistor to control each pixel, and is more expensive.

An OLED flat panel display is an array of light emitting diodes, made of organic polymeric materials. Existing OLED flat panel displays are based on both passive and active configurations. Unlike the LCD display, which controls light transmission or reflection, an OLED display emits light, the intensity of which is controlled by the electrical bias applied thereto. Flat-panels are also used for miniature image display systems because of their compactness and energy efficiency compared to the CRT displays. Small size real image displays have a relatively small surface area on which to present a real image, thus have limited capability for providing sufficient information to the user. In other words, because of the limited resolution of the human eye, the amount of details resolved from a small size real image might be insufficient.

By contrast to a real image, a virtual image is defined as an image, which is not projected onto or emitted from a viewing surface, and no light ray connects the image and an observer. A virtual image can only be seen through an optic element, for example a typical virtual image can be obtained from an object placed in front of a converging lens, between the lens and its focal point. Light rays, which are reflected from an individual point on the object, diverge when passing through the lens, thus no two rays share two endpoints. An observer, viewing from the other side of the lens would perceive an image, which is located behind the object, hence enlarged. A virtual image of an object, positioned at the focal plane of a lens, is said to be projected to infinity. A virtual image display system, which includes a miniature display panel and a lens, can enable viewing of a small size, but high content display, from a distance much smaller than 25 cm. Such a display system can provide a viewing capability which is equivalent to a high content, large size real image display system, viewed from much larger distance.

Conventional virtual image displays are known to have many shortcomings. For example, such displays have suffered from being too heavy for comfortable use, as well as too large so as to be obtrusive, distracting and even disorienting. These defects stem from, inter alia, the incorporation of relatively large optics systems within the mounting structures, as well as physical designs which fail to adequately take into account important factors as size, shape, weight, etc.

Recently, holographic optical elements have been used in portable virtual image displays. Holographic optical elements serve as an imaging lens and a combiner where a two-dimensional, quasi-monochromatic display is imaged to infinity and reflected into the eye of an observer. A common problem to all types of holographic optical elements is their relatively high chromatic dispersion. This is a major drawback in applications where the light source is not purely monochromatic. Another drawback of some of these displays is the lack of coherence between the geometry of the image and the geometry of the holographic optical element, which causes aberrations in the image array that decrease the image quality.

New designs, which typically deal with a single holographic optical element, compensate for the geometric and chromatic aberrations by using non-spherical waves rather than simple spherical waves for recording; however, they do not overcome the chromatic dispersion problem. Moreover, with these designs, the overall optical systems are usually very complicated and difficult to manufacture. Furthermore, the field-of-view resulting from these designs is usually very small.

U.S. Pat. No. 4,711,512 to Upatnieks, the contents of which are hereby incorporated by reference, describes a diffractive planar optics head-up display configured to transmit collimated light wavefronts of an image, as well as to allow light rays coming through the aircraft windscreen to pass and be viewed by the pilot. The light wavefronts enter an elongated optical element located within the aircraft cockpit through a first diffractive element, are diffracted into total internal reflection within the optical element, and are diffracted out of the optical element by means of a second diffractive element into the direction of the pilot's eye while retaining the collimation. Upatnieks, however, does not teach how the display could transmit a wide field-of-view, or tackle a broad spectrum of wavelengths (for providing color images).

U.S. Pat. No. 5,966,223 to Friesem et al., the contents of which are hereby incorporated by reference describes a holographic optical device similar to that of Upatnieks, with the additional aspect that the first diffractive optical element acts further as the collimating element that collimates the waves emitted by each data point in a display source and corrects for field aberrations over the entire field-of-view. The field-of-view discussed is ±6°, and there is a further discussion of low chromatic sensitivity over wavelength shift of $\Delta\lambda_c$ of ±2 nm around a center wavelength $\lambda_c$ of 632.8 nm. However, the diffractive collimating element of Friesem et al. is known to narrow spectral response, and the low chromatic sensitivity at spectral range of ±2 nm becomes an unacceptable sensitivity at ±20 nm or ±70 nm.

U.S. Pat. No. 6,757,105 to Niv et al., the contents of which are hereby incorporated by reference, provides a diffractive optical element for optimizing a field-of-view for a multicolor spectrum. The optical element includes a light-transmissive substrate and a linear grating formed therein. Niv et al. teach how to select the pitch of the linear grating and the refraction index of the light-transmissive substrate so as to trap a light beam having a predetermined spectrum and characterized by a predetermined field of view to propagate within the light-transmissive substrate via total internal reflection. Niv et al. also disclose an optical device incorporating the aforementioned diffractive optical element for transmitting light in general and images in particular into the eye of the user.

The above prior art virtual image devices, however, provide a single optical channel, hence allowing the scene of interest to be viewed by one eye. It is recognized that the ability of any virtual image devices to transmit an image without distortions inherently depends on whether or not light rays emanating from all points of the image are successfully transmitted to the eye of the user in their original wavelength. Due to the single optical channel employed by presently known devices, the filed-of-view which can be achieved without distortions or loss of information is rather limited.

Although attempts have been made to develop binocular viewing systems [see, e.g., U.S. Pat. No. 4,805,988 to Dones and International Patent Application No. WO 01/95027 to Amitai], these systems are rather bulky, heavily rely on relative positioning and/or relative alignment and are generally less than fully satisfactory. For example, in many traditional binocular viewing systems, two different image paths are outputted to the eyes of the user, and it is necessary to substantially align the these optical paths with the user's eyes, such that the center of each image falls on the center of the user's field of view. Any departure from such alignment can have many undesirable consequences including loss of image quality, as perceived by the user, user eye strain or fatigue.

There is thus a widely recognized need for, and it would be highly advantageous to have wide field-of-view binocular device, devoid the above limitations.

SUMMARY OF THE INVENTION

According to one aspect of the present invention there is provided an optical device for transmitting light striking the optical device at a plurality of angles defining a field-of-view, the optical device comprising a light-transmissive substrate formed with at least one input optical element and a plurality of output optical elements; the at least one input optical element being designed and constructed to diffract the light into the light-transmissive substrate in a manner such that different portions of the light, corresponding to different portions of the field-of-view, propagate in different directions within the light-transmissive substrate; and the plurality of output optical elements being designed and constructed to complementarily diffract the different portions of the light out of the light-transmissive substrate, thereby to substantially preserve the field-of-view.

According to further features in preferred embodiments of the invention described below, each of the at least one input optical element and the plurality of output optical elements is independently a linear diffraction grating.

According to still further features in the described preferred embodiments the plurality of output optical elements comprise a first output optical element diffracting a first portion of the field-of-view, and a second output optical element, diffracting a second portion of the field-of-view.

According to still further features in the described preferred embodiments the linear diffraction grating of the at least one input optical element, the linear diffraction grating of the first output optical element and the linear diffraction grating of the second output optical element are designed and constructed such that each light ray, being in the predetermined overlap, bifurcates within the device and exits the light-transmissive substrate in a form of two substantially parallel light rays.

According to still further features in the described preferred embodiments the light has a plurality of wavelengths defining a spectrum and further wherein different portions of the spectrum are complementarily diffracted out of the light-transmissive substrate by the plurality of output optical elements.

According to still further features in the described preferred embodiments the light has a plurality of wavelengths, respectively corresponding to a plurality of wavelength-dependent field-of-views, and further wherein the light-transmissive substrate, the at least one input optical element and the plurality of output optical elements are designed and constructed so as to maximize an overlap among the plurality of wavelength-dependent field-of-views.

According to still further features in the described preferred embodiments the plurality of output optical elements comprise a first output optical element and a second output optical element.

According to still further features in the described preferred embodiments the spectrum has a first portion and a second portion, each of the first and the second portions of the spectrum being diffracted out of the light-transmissive substrate by at least one of the first and the second output optical elements.

According to still further features in the described preferred embodiments the light-transmissive substrate, the at least one input optical element, the first output optical element and the second output optical element are designed and constructed such that when the first and the second portions of the spectrum strike the optical device at an angle within a first predetermined range, the first portion of the spectrum is diffracted out of the light-transmissive substrate by the first output optical element, and the second portion of the spectrum is diffracted out of the light-transmissive substrate by the second output optical element.

According to still further features in the described preferred embodiments the light-transmissive substrate, the at least one input optical element, the first output optical element and the second output optical element are designed and constructed such that: when the first portion of the spectrum strike the optical device at an angle within a first predetermined range, the first portion of the spectrum is diffracted out of the light-transmissive substrate by the first output optical element; and when the first portion of the spectrum strike the optical device at an angle within a second first predetermined range, the first portion of the spectrum is diffracted out of the light-transmissive substrate by the second output optical element.

According to another aspect of the present invention there is provided a binocular device for transmitting an image into a first eye and a second eye of a user, the binocular device comprising: an input optical element, formed in a light-transmissive substrate and capable of diffracting the image into the light-transmissive substrate; a first output optical element, formed in the light-transmissive substrate and capable of diffracting a first portion of the image out of the light-transmissive substrate into the first eye; and a second output optical element, formed in the light-transmissive substrate and capable of diffracting a second portion of the image out of the light-transmissive substrate into the second eye.

According to further features in preferred embodiments of the invention described below, the linear diffraction grating of the input optical element, the linear diffraction grating of the first output optical element and the linear diffraction grating of the second output optical element are designed and constructed such that each light ray, emitted by or reflected from the predetermined overlap, bifurcates within the device and exits the light-transmissive substrate in a form of two substantially parallel light rays, respectively propagating into the first and the second eyes.

According to still further features in the described preferred embodiments the image is a multicolor image characterized by a spectrum having a first portion and a second portion, each of the first and the second portions of the spectrum being diffracted out of the light-transmissive substrate by at least one of the first and the second output optical elements.

According to still further features in the described preferred embodiments the first portion of the spectrum of the first portion of the image is diffracted out of the light-transmissive substrate by the first output optical element, and the first portion of the spectrum of the second portion of the image is diffracted out of the light-transmissive substrate by the second output optical element.

According to still further features in the described preferred embodiments the first portion of the spectrum of the first portion of the image is diffracted out of the light-transmissive substrate by the first output optical element, and the second portion of the spectrum of the first portion of the image is diffracted out of the light-transmissive substrate by the second output optical element.

According to still further features in the described preferred embodiments the image is a multicolor image having a plurality of wavelengths, respectively corresponding to a plurality of wavelength-dependent portions of the image, and further wherein the light-transmissive substrate, the at least one input optical element and the plurality of output optical elements are designed and constructed so as to maximize an overlap among the plurality of wavelength-dependent portions of the image.

According to still further features in the described preferred embodiments the linear diffraction grating of the at least one input optical element, the linear diffraction grating of the first output optical element and the linear diffraction grating of the second output optical element, have substantially identical periods.

According to still further features in the described preferred embodiments the linear diffraction grating of the at least one input optical element, the linear diffraction grating of the first output optical element and the linear diffraction grating of the second output optical element, are substantially parallel.

According to yet another aspect of the present invention there is provided a binocular device for transmitting an image into a first eye and a second eye of a user, the binocular device comprising a first monocular device for providing the first eye with a first asymmetric field-of-view and a second monocular device for providing the second eye with a second asymmetric field-of-view, the first and second asymmetric field-of-views being mutually complementary to a combined field-of-view.

According to further features in preferred embodiments of the invention described below, each of the first and the second monocular devices is defined by a light-transmissive substrate, an input optical element and an output optical element, such that the first and the second monocular devices share the light-transmissive substrate and the input optical element.

According to still further features in the described preferred embodiments the first and the second monocular devices are designed and constructed so as to provide a predetermined overlap between the first asymmetric field-of-view and the second asymmetric field-of-view.

According to still further features in the described preferred embodiments the first and the second monocular devices are designed and constructed such that each light ray, being in the predetermined overlap, bifurcates within the binocular device and exits through the first and the second monocular devices in a form of two substantially parallel light rays, respectively propagating into the first and the second eyes.

According to still further features in the described preferred embodiments the image is a multicolor image characterized by a spectrum having a first portion and a second portion, and further wherein the first and the second monocular devices are designed and constructed such each eye is provided with at least one of the first and the second portions of the spectrum.

According to still further features in the described preferred embodiments the first and the second monocular devices are designed and constructed such that when the first and the second portions of the spectrum strike the binocular device at an angle within a first predetermined range, the first eye is provided with the first portion of the spectrum, and the second eye is provided with the second portion of the spectrum.

According to still further features in the described preferred embodiments the first and the second monocular devices are designed and constructed such that: when the first portion of the spectrum strike the binocular device at an angle within a first predetermined range, the first eye is provided with the first portion of the spectrum; and when the first portion of the spectrum strike the optical device at an angle within a second first predetermined range, the second eye is provided with the first portion of the spectrum.

According to still further features in the described preferred embodiments the image is a multicolor image having a plurality of wavelengths, each corresponding to a wavelength-dependent combined field-of-view, and further wherein the first and the second monocular devices are designed and constructed so as to maximize an overlap between at least two wavelength-dependent combined field-of-views.

According to still further features in the described preferred embodiments the device further comprises an input light source for producing the light.

According to still further features in the described preferred embodiments the input light source comprises an input display source, hence the light constitutes an image.

According to still further features in the described preferred embodiments the device further comprises a collimator for collimating the light produced by the input light source.

According to still further features in the described preferred embodiments the collimator comprises a converging lens.

According to still further features in the described preferred embodiments the converging lens is a spherical converging lens.

According to still further features in the described preferred embodiments the converging lens is a non-spherical converging lens.

According to still further features in the described preferred embodiments the collimator comprises an arrangement of lenses.

According to still further features in the described preferred embodiments the collimator comprises a diffractive optical element.

According to still another aspect of the present invention there is provided a method of transmitting light striking light-transmissive substrate at a plurality of angles defining a field-of-view, the method comprising: (a) diffracting the light into the light-transmissive substrate in a manner such that different portions of the light, corresponding to different portions of the field-of-view, propagate in different directions within the light-transmissive substrate; and (b) complementarily diffracting the different portions of the light out of the light-transmissive substrate, so as to substantially preserve the field-of-view.

According to further features in preferred embodiments of the invention described below, steps (a) and (b) are executed so as to provide a predetermined overlap between the first and the second portions of the field-of-view.

According to still further features in the described preferred embodiments step (a) comprises bifurcating each light ray, being in the predetermined overlap, into a bifurcated light ray, and step (b) comprises diffracting the bifurcated light ray out of the light-transmissive substrate in a form of two substantially parallel light rays.

According to still further features in the described preferred embodiments the light has a plurality of wavelengths, respectively corresponding to a plurality of wavelength-dependent field-of-views, and further wherein steps (a) and (b) are executed so as to maximize an overlap among the plurality of wavelength-dependent field-of-views.

According to still further features in the described preferred embodiments the light has a plurality of wavelengths defining a spectrum having a first portion and a second portion, each of the first and the second portions of the spectrum being diffracted out of the light-transmissive substrate by at least one linear diffraction grating.

According to still further features in the described preferred embodiments step (b) comprises: if both the first and the second portions of the spectrum strike the light-transmissive substrate at an angle within a first predetermined range, then diffracting the first portion of the spectrum by a first linear diffraction grating and the second portion of the spectrum by a second linear diffraction grating.

According to still further features in the described preferred embodiments step (b) comprises: if the first portion of the spectrum strikes the light-transmissive substrate at an angle within a first predetermined range, then diffracting the first portion of the spectrum by a first linear diffraction grating; and if the first portion of the spectrum strikes the light-transmissive substrate at an angle within a second predetermined range, then diffracting the first portion of the spectrum by a second linear diffraction grating.

According to still further features in the described preferred embodiments the method further comprises producing the light using an input light source.

According to still further features in the described preferred embodiments the method further comprises producing an image to be constituted by the light using an input display source.

According to still further features in the described preferred embodiments the method further comprises collimating the light produced by the input light source using a collimator.

According to still further features in the described preferred embodiments a ratio between a wavelength of the light and a period characterizing the linear diffraction gratings is larger than or equal a unity.

According to still further features in the described preferred embodiments a period characterizing the linear diffraction gratings is larger than $\lambda_R/(n_S p)$ and smaller than $\lambda_B$, the $n_S$ being a refraction index of the light-transmissive substrate, the p being a predetermined parameter, the $\lambda_R$ being a longest wavelength of the spectrum and the $\lambda_B$ being a shortest wavelength of the spectrum.

According to still further features in the described preferred embodiments a ratio between a wavelength of the light and a period characterizing the linear diffraction gratings is smaller than a refraction index of the light-transmissive substrate.

According to an additional aspect of the present invention there is provided a method of transmitting an image into a first eye and a second eye of a user, the method comprising: (a) diffracting the image into a light-transmissive substrate; (b) diffracting a first portion of the image out of the light-transmissive substrate into the first eye; and (c) diffracting a second portion of the image out of the light-transmissive substrate into the second eye.

According to further features in preferred embodiments of the invention described below, steps (a)-(c) are each independently effected by a linear diffraction grating.

According to still further features in the described preferred embodiments steps (a)-(c) are executed so as to provide a predetermined overlap between the first and the second portions of the image.

According to still further features in the described preferred embodiments step (a) comprises bifurcating each light ray, emitted by or reflected from the predetermined overlap, into a bifurcated light ray, and steps (b) and (c) respectively comprises diffracting the bifurcated light ray out of the light-transmissive substrate in a form of two substantially parallel light rays propagating into the first and the second eyes.

According to still further features in the described preferred embodiments step (b) comprises diffracting the first portion of the spectrum into the first eye, and step (c) comprises diffracting the first portion of the spectrum into the second eye.

According to still further features in the described preferred embodiments step (b) further comprises diffracting the second portion of the spectrum into the second eye.

According to still further features in the described preferred embodiments the image is a multicolor image having a plurality of wavelengths, respectively corresponding to a plurality of wavelength-dependent portions of the image, and further wherein steps (a)-(c) are executed so as to maximize an overlap among the plurality of wavelength-dependent portions of the image.

According to yet an additional aspect of the present invention there is provided a method of transmitting an image into a first eye and a second eye of a user, the method comprising: (a) transmitting a first asymmetric field-of-view to the first eye with; and (b) transmitting a second asymmetric field-ofview to the second eye; the first and second asymmetric field-of-views being mutually complementary to a combined field-of-view.

According to further features in preferred embodiments of the invention described below, steps (a) and (b) are each independently effected by a linear diffraction grating.

According to still further features in the described preferred embodiments steps (a) and (b) are executed so as to provide a predetermined overlap between the first and the second asymmetric field-of-views.

According to still further features in the described preferred embodiments the method further comprises bifurcating each light ray, being in the predetermined overlap, into a bifurcated light ray, wherein steps (b) and (c) respectively comprises transmitting the bifurcated light ray into the first and the second eyes in a form of two substantially parallel light rays.

According to still further features in the described preferred embodiments step (a) comprises transmitting the first portion of the spectrum into the first eye, and step (b) comprises diffracting the first portion of the spectrum into the second eye.

According to still further features in the described preferred embodiments step (a) further comprises transmitting the second portion of the spectrum into the second eye.

According to still further features in the described preferred embodiments the image is a multicolor image having a plurality of wavelengths, each corresponding to a wavelength-dependent combined field-of-view, and further wherein steps (a) and (b) are executed so as to maximize an overlap between at least two wavelength-dependent combined field-of-views.

According to still further features in the described preferred embodiments the method further comprises producing the image using an input display source.

According to still further features in the described preferred embodiments the method further comprises collimating light constituting the image using a collimator.

According to still further features in the described preferred embodiments the combined field-of-view is symmetric.

According to still further features in the described preferred embodiments the combined field-of-view is asymmetric.

According to still further features in the described preferred embodiments the combined field-of-view is of at least 20 degrees.

According to still further features in the described preferred embodiments the combined field-of-view is of at least 30 degrees.

According to still further features in the described preferred embodiments the combined field-of-view is of at least 40 degrees. According to still further features in the described preferred embodiments the propagation of the light within the light-transmissive substrate is via total internal reflection which is characterized by a predetermined maximal diffraction angle.

According to still further features in the described preferred embodiments the predetermined maximal diffraction angle equals about 80 degrees with respect to a perpendicular orientation to the light-transmissive substrate.

According to still further features in the described preferred embodiments the predetermined maximal diffraction angle is selected so as to allow at least one reflection within a predetermined distance.

According to still further features in the described preferred embodiments the predetermined distance is from about 30 mm to about 80 mm.

According to still further features in the described preferred embodiments a thickness of the light-transmissive substrate is selected so as to allow simultaneous propagation of the plurality of wavelengths.

According to still further features in the described preferred embodiments $\lambda_B$ is between about 400 to about 500 nm.

According to still further features in the described preferred embodiments $\lambda_R$ is between about 600 to about 700 nm.

According to still further features in the described preferred embodiments a thickness of the light-transmissive substrate is from about 0.5 mm to about 5 mm.

According to still further features in the described preferred embodiments a thickness of the light-transmissive substrate is selected so as to allow simultaneous propagation of a plurality of wavelengths.

According to still further features in the described preferred embodiments a thickness of the light-transmissive substrate is larger than $10\lambda_R$.

According to still further features in the described preferred embodiments the light-transmissive substrate is selected from the group consisting of glass and a transparent polymer.

According to still further features in the described preferred embodiments the linear diffraction grating is selected from the group consisting of reflection linear diffraction grating and transmission linear diffraction grating.

According to still further features in the described preferred embodiments the linear diffraction grating is recorded by a procedure selected from a group consisting of holography, computer-generated masks, lithography, embossing, etching and direct writing.

The present invention successfully addresses the shortcomings of the presently known configurations by providing methods and optical devices, and, in particular binocular devices, capable of transmitting wide field-of-view images.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
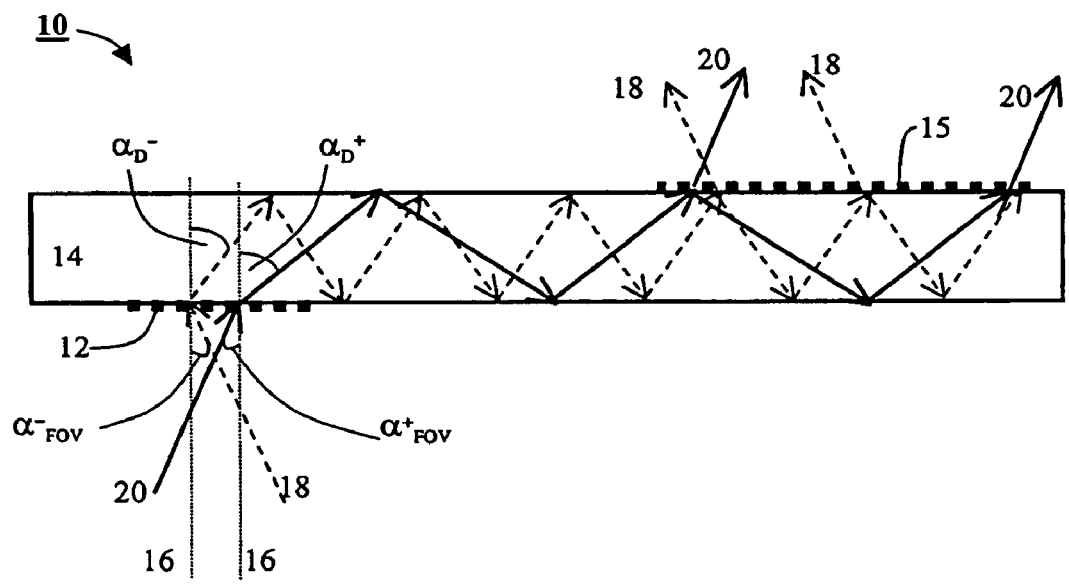
FIG. 1 is a schematic illustration of a prior art monocular device.

The present invention is of a wide field-of-view binocular device which can be used to provide wide field-of-view of monochromatic or multi-chromatic images. Specifically, the present invention can be used in many applications in which virtual images are viewed by a binocular vision, including, without limitation, e.g., binoculars, head mounted displays, head-up displays, cellular telephones, personal digital assistants, aircraft cockpits and the like.

The principles and operation of a diffractive optical element, optical device and methods according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

When a ray of light moving within a light-transmissive substrate and striking one of its internal surfaces at an angle $\alpha_I$ as measured from a normal to the surface, it can be either reflected from the surface or refracted out of the surface into the open air in contact with the substrate. The condition according to which the light is reflected or refracted is determined by Snell's law, which is mathematically realized through the following equation:

$$n_A \sin \alpha_2 = n_S \sin \alpha_I, \quad (EQ. 1)$$

where $n_S$ is the index of refraction of the light-transmissive substrate, $n_A$ is the index of refraction of the medium outside the light transmissive substrate ($n_S > n_A$), and $\alpha_2$ is the angle in which the ray is refracted out, in case of refraction. Similarly to $\alpha_I$, $\alpha_2$ is measured from a normal to the surface. A typical medium outside the light transmissive substrate is air having an index of refraction of about unity.

As used herein, the term "about" refers to ±10%.

As a general rule, the index of refraction of any substrate depends on the specific wavelength $\lambda$ of the light which strikes its surface. Given the impact angle, $\alpha_I$, and the refraction indices, $n_S$ and $n_A$, Equation 1 has a solution for $\alpha_2$ only for $\alpha_I$ which is smaller than arcsine of $n_A/n_S$ often called the critical angle and denoted $\alpha_c$. Hence, for sufficiently large $\alpha_I$ (above the critical angle), no refraction angle $\alpha_2$ satisfies Equation 1 and light energy is trapped within the light-transmissive substrate. In other words, the light is reflected from the internal surface as if it had stroked a mirror. Under these conditions, total internal reflection is said to take place. Since different wavelengths of light (i.e., light of different colors) correspond to different indices of refraction, the condition for total internal reflection, depends not only on the angle at which the light strikes the substrate, but also on the wavelength of the light. In other words, an angle which satisfies the total internal reflection condition for one wavelength may not satisfy this condition for a different wavelength.

In planar optics there is a variety of optical elements which are designed to provide an appropriate condition of total internal reflection so that a light will be transmitted within a light transmissive substrate over a predetermined optical distance. Typically, such optical elements are manufactured as linear gratings which are located on one surface of a light-transmissive substrate at or opposite to the entry point of the light rays. A linear grating is characterized by a so-called grating period or grating pitch, d, which is directly related to the wavelength, $\lambda$, of the light and to the angles $\alpha_I$ and $\alpha_D$, at which a ray of the light incident the light-transmissive substrate and diffracted inwards, respectively. The relation is given by the following equation:

$$n_S \sin \alpha_D - n_A \sin \alpha_I = \pm \lambda/d. \quad (EQ. 2)$$

According the known conventions, the sign of $\alpha_I$ and $\alpha_D$ is positive, if the angles are measured clockwise from the normal to the surface, and negative otherwise. The dual sign on the RHS of Equation 2 relates to two possible orders of diffraction, +1 and −1, corresponding to diffractions in opposite direction, say, "diffraction to the right" and "diffraction to the left," respectively.

The available range of incident angles is often referred to in the literature as a "field-of-view." A field-of-view can be expressed either inclusively, in which case its value corresponds to the difference between the minimal and maximal incident angles, or explicitly in which case the field-of-view has a form of a mathematical range or set. Thus, for example, a field-of-view, $\phi$, spanning from a minimal incident angle, $\alpha$, to a maximal incident angle, $\beta$, is expressed inclusively as $\phi = \beta - \alpha$, and exclusively as $\phi = [\alpha, \beta]$. The minimal and maximal incident angles are also referred to as leftmost and rightmost incident angles or clockwise and anticlockwise field-of-view angles, in any combination. The inclusive and exclusive representations of the field-of-view are used herein interchangeably.

The wide spectrum of wavelengths of the visible light and the relatively sensitive dependence of the total internal reflection condition on both angle and wavelength make the known optical elements suitable only for relatively small angles.

The present invention successfully provides methods an apparati for providing a wide field-of-view. For purposes of better understanding the present invention, as illustrated in FIGS. 2-4 of the drawings, reference is first made to the construction and operation of a conventional (i.e., prior art) monocular device as illustrated in FIG. 1.

Figure 2:
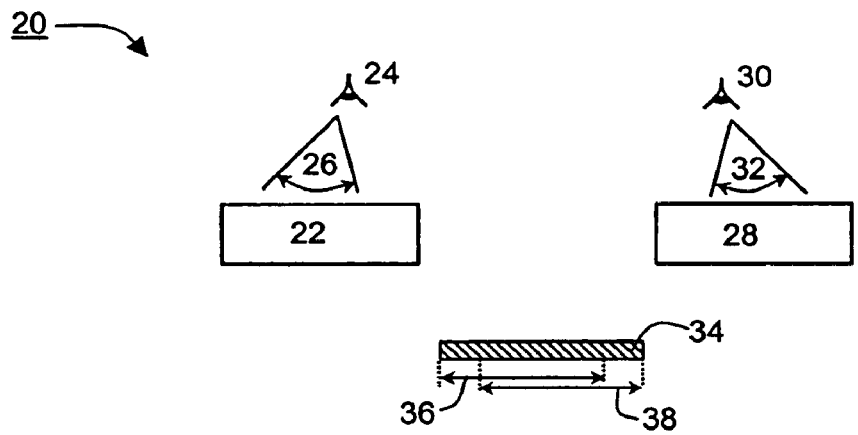
FIG. 2 is a schematic illustration of a binocular device for transmitting an image into a first eye and a second eye of a user, according to a preferred embodiment of the present invention.

Hence FIG. 1 illustrates a monocular device 10 including a light-transmissive substrate 14 formed with an input optical element 12 and an output optical element 15, which are typically linear diffraction gratings. Device 10 is designed to transmit light striking substrate 14 at a plurality of angles defining a field-of-view. The field-of-view is illustrated in FIG. 1 by its rightmost light ray 18, striking substrate 14 at an angle $\alpha^-_{FOV}$, and leftmost light ray 20, striking substrate 14 at an angle $\alpha^+_{FOV}$. $\alpha^-_{FOV}$ is measured anticlockwise from a normal 16 to substrate 14, and $\alpha^+_{FOV}$ is measured clockwise from normal 16. Thus, according to the above convention, $\alpha^-_{FOV}$ has a negative value and $\alpha^+_{FOV}$ has a positive value, resulting in a field-of-view of $\phi = \alpha^+_{FOV} + |\alpha^-_{FOV}|$, in inclusive representation.

Input optical element 12 is designed to trap all light rays in the field-of-view within substrate 14. Specifically, when the light rays in the field-of-view impinge on element 12, they are diffracted at a diffraction angle (defined relative to normal 16) which is larger than the critical angle, such that upon striking the other surface of substrate 14, all the light rays of the field-of-view experiences total internal reflection and propagate within substrate 14. The diffraction angles of leftmost ray 20 and rightmost ray 18 are designated in FIG. 1 by $\alpha_D^+$ and $\alpha_D^-$, respectively.

The propagated light, after a few reflections within substrate 14, reaches output optical element 15 which diffracts the light out of substrate 14. As shown in FIG. 1, only a portion of the light energy exits substrate 14. The remnant of each ray is redirected through an angle, which causes it, again, to experience total internal reflection from the other side of substrate 14. After a first reflection, the remnant may re-strike element 15, and upon each such re-strike, an additional part of the light energy exits substrate 14.

For a given spectral range of the light, elements 12 and 15 can be designed solely based on the value of $\alpha^-_{FOV}$ and the value of the shortest wavelength of the spectral range. The optical properties of substrate 14 (e.g., its refraction index) can be selected based on the specific design of the input/output optical elements and the maximal diffraction angle, beyond which the light does not reach output optical element 15.

As can be understood from the geometrical configuration illustrated in FIG. 1, the diffraction angles, $\alpha_D^+$ and $\alpha_D^-$, hence also are typically different. As the diffraction angles depend on the incident angles (see Equation 2, for the case in which element 12 is a linear diffraction grating), the allowed clockwise ($\alpha^+_{FOV}$) and anticlockwise ($\alpha^-_{FOV}$) field-of-view angles, are also different. Thus, monocular device 10 supports transmission of asymmetric field-of-view in which, say, the clockwise field-of-view angle is smaller than the anticlockwise field-of-view angle. For a prior art monocular device, the difference between the absolute values of the clockwise and anticlockwise field-of-view angles can reach more than 70% of the total field-of-view.

While conceiving the present invention it has been hypothesized and while reducing the present invention to practice it has been realized that a wider field-of-view can be transmitted through optical devices, using a configuration in which different portions of the field-of-view are transmitted by different optical elements. Hence, according to a preferred embodiment of the present invention a light-transmissive substrate can be formed with at least one input optical element and a plurality of output optical elements. The input optical element (s) serve for diffracting the light into the light-transmissive substrate in a manner such that different portions of the light, corresponding to different portions of the field-of-view, propagate within light-transmissive substrate in different directions to thereby reach the output optical elements. The output optical elements complementarily diffract the different portions of the light out of the light-transmissive substrate.

The term "diffracting" as used herein, refers to a change, $\Delta\theta$, in the propagation direction of a wavefront, in either a transmission mode or a reflection mode. In a transmission mode, "diffracting" refers to change in the propagation direction of a wavefront while passing through an optical element; in a reflection mode, "diffracting" refers to change in the propagation direction of a wavefront while reflecting off an optical element. In angular terminology, $\Delta\theta$ is smaller than 90° in transmission mode and larger than 90° in reflection mode.

The terms "complementarily" or "complementary," as used herein in conjunction with a particular observable or quantity (e.g., field-of-view, image, spectrum), refer to a combination of two or more overlapping or non-overlapping portions of the observable or quantity so as to provide the information required for substantially reconstructing the original observable or quantity.

Any number of input/output optical elements can be used. Additionally, the number of input optical elements and the number of output optical elements may be different, as two or more output optical elements may share the same input optical element by optically communicating therewith. The input and output optical element can be formed on a single light-transmissive substrate or a plurality of light-transmissive substrates, as desired. For example, in one embodiment the input and output optical element are linear diffraction gratings, preferably of identical periods, formed on a single light-transmissive substrate, preferably in a parallel orientation.

If several input/output optical elements are formed on the same light-transmissive substrate, as in the above embodiment, they can engage any side of the light-transmissive substrate, in any combination.

One ordinarily skilled in the art would appreciate that this corresponds to any combination of transmissive and reflective optical elements. Thus, for example, suppose that there is one input optical element, formed on a first side of the light-transmissive substrate and two output optical elements formed on a second side of light-transmissive substrate. Suppose further that the light impinges on the first side of the light-transmissive substrate and it is desired to diffract the light out of the second side. In this case, the input optical element and the two output optical elements are all transmissive, so as to ensure that entrance of the light through the input optical element, and the exit of the light through the output optical elements. Alternatively, if the input and output optical elements are all formed on the first side of the light-transmissive substrate, then the input optical element remain transmissive, so as to ensure the entrance of the light therethrough, while the output optical elements are reflective, so as to reflect the propagating light at an angle which is sufficiently small to couple the light out.

Referring now again to the drawings, FIG. 2 schematically illustrates a binocular device 20 for transmitting an image into a first eye and a second eye of a user, according to a preferred embodiment of the present invention.

Hence, device 20 comprises a first monocular device 22, for providing a first eye 24 with a first asymmetric field-of-view 26 and a second monocular device 28 for providing a second eye 30 with a second asymmetric field-of-view 32. First 26 and second 32 asymmetric field-of-views preferably correspond to different portions of an image 34, which different portions are designated in FIG. 1 by numerals 36 and 38.

Monocular devices for providing asymmetric field-of-views are known in the art and can be found, for example, in U.S. Pat. No. 6,757,105. Hence, according to a preferred embodiment of the present invention each monocular device comprises an input optical element (e.g., element 12) and an output optical element (e.g., element 15), formed in a light-transmissive substrate (e.g., substrate 14), similarly to the configuration of device 10. Both first 22 and second 28 monocular devices may share the input optical element and/or the light-transmissive substrate, as further detailed hereinabove.

The human visual system is known to possess a physiological mechanism capable of inferring a complete image based on several portions thereof, provided sufficient information reaches the retinas. This physiological mechanism operates on monochromatic as well as chromatic information received from the rod cells and cone cells of the retinas. Thus, in a cumulative nature, the two asymmetric field-of-views, reaching each individual eye, form a combined field-of-view perceived by the user, which combined field-of-view is wider than each individual asymmetric field-of-view.

According to a preferred embodiment of the present invention, there is a predetermined overlap between first 26 and second 32 asymmetric field-of-views, which overlap allows the user's visual system to combine portions 36 and 38, thereby to perceive the image, as if it has been fully observed by each individual eye.

For example, as further demonstrated in the Examples section that follows, monocular devices 22 and 28 can be constructed such that the exclusive representations of first 26 and second 32 asymmetric field-of-views are, respectively, $[-\alpha, \beta]$ and $[\beta, \alpha]$, resulting in a symmetric combined field-of-view of $[-\beta, \beta]$ It will be appreciated that when $\beta >> \alpha > 0$, the combined field-of-view is considerably wider than each of the asymmetric field-of-views.

When the image is a multicolor image having a spectrum of wavelengths, different portions of the spectrum correspond to different, wavelength-dependent, asymmetric field-of-views, which, in different combinations, form different wavelength-dependent combined field-of-views. For example, a red light can correspond to a first red asymmetric field-of-view, and a second red asymmetric field-of-view, which combine to a red combined field-of-view. Similarly, a blue light can correspond to a first blue asymmetric field-of-view, and a second blue asymmetric field-of-view, which combine to a blue combined field-of-view, and so on. Thus, a multicolor configuration is characterized by a plurality of wavelength-dependent combined field-of-views. According to a preferred embodiment of the present invention first 22 and second 28 monocular devices are designed and constructed so as to maximize an overlap between two or more of the wavelength-dependent combined field-of-views.

In terms of spectral coverage, the design of binocular device 20 is preferably as follows: first monocular device 22 provides first eye 24 with, say, a first portion of the spectrum which originates from portion 36 of the image, and a second portion of the spectrum which originates from portion 38 of the image. Second monocular device 28 preferably provides the complementary information, so as to allow the aforementioned physiological mechanism to infer the complete spectrum of the image. Thus, device 28 preferably provides eye 30 with the first portion of the spectrum originating from portion 38, and the second portion of the spectrum originating from portion 36.

Ideally, a multicolor image is a spectrum as a function of wavelength, measured at a plurality of image elements. This ideal input, however, is rarely attainable in practical systems. Therefore, the present embodiment also addresses other forms of imagery information. A large percentage of the visible spectrum (color gamut) can be represented by mixing red, green, and blue colored light in various proportions, while different intensities provide different saturation levels. Sometimes, other colors are used in addition to red, green and blue, in order to increase the color gamut. In other cases, different combinations of colored light are used in order to represent certain partial spectral ranges within the human visible spectrum.

In a different form of color imagery, a wide-spectrum light source is used, with the imagery information provided by the use of color filters. The most common such system is using white light source with cyan, magenta and yellow filters, including a complimentary black filter. The use of these filters could provide representation of spectral range or color gamut similar to the one that uses red, green and blue light sources, while saturation levels are attained through the use of different optical absorptive thickness for these filters, providing the well known "grey levels."

Thus, the multicolored image can be displayed by three or more channels, such as Red-Green-Blue (RGB) channels, which are typically used for active display systems (e.g., CRT or OLED), or Cyan-Magenta-Yellow-Black (CMYK) images which are typically used for passive display systems (e.g., LCD display or print). Other forms are also contemplated within the scope of the present invention.

When the multicolor image is formed from a discrete number of colors (e.g. an RGB display), the portions of the spectrum can be discrete values of wavelength. For example, a multicolor image can be provided by an OLED array having red, green and blue organic diodes which are viewed by the eye as continues spectrum of colors due to many different combinations of relative proportions and intensities between the wavelengths of light emitted thereby. For such images, the first and the second portions of the spectrum can correspond to the wavelengths emitted by two of the blue, green and red diodes of the OLED array, for example the blue and red. As further demonstrated in the Example section that follows, device 20 can be constructed such that, say, eye 30 is provided with blue light from portion 36 and red light from portion 38 whereas eye 24 is provided with red light from portion 36 and blue light from portion 38, such that the entire spectral range of the image is transmitted into the two eyes and the physiological mechanism reconstructs the image.

Figure 3A:
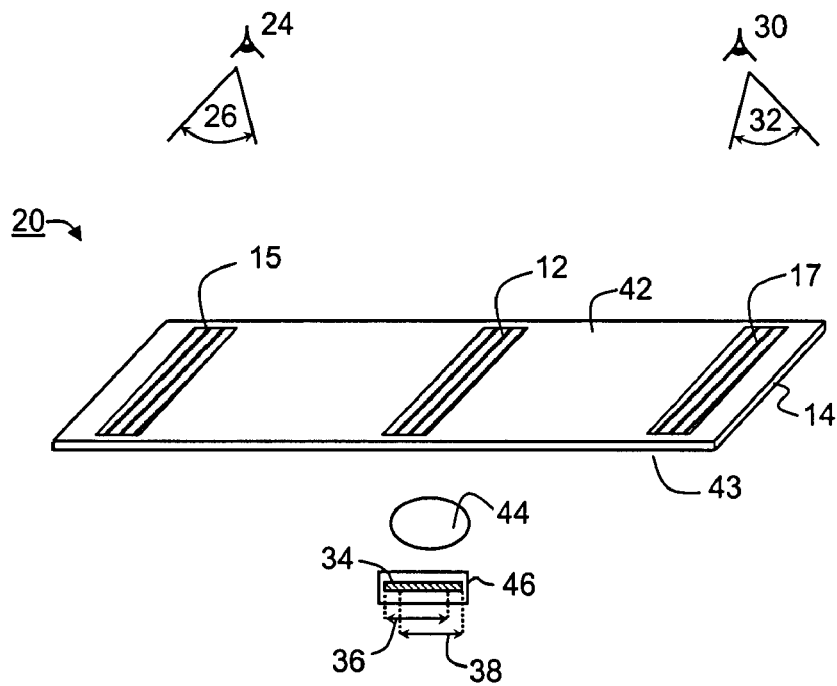
FIGS. 3a-b are schematic illustrations of an isometric view (FIG. 3a) and a side view (FIG. 3b) of an optical device having one input optical element and two output optical elements, hence can be used as the binocular device of FIG. 2, in accordance with preferred embodiments of the present invention.
Figure 3B:
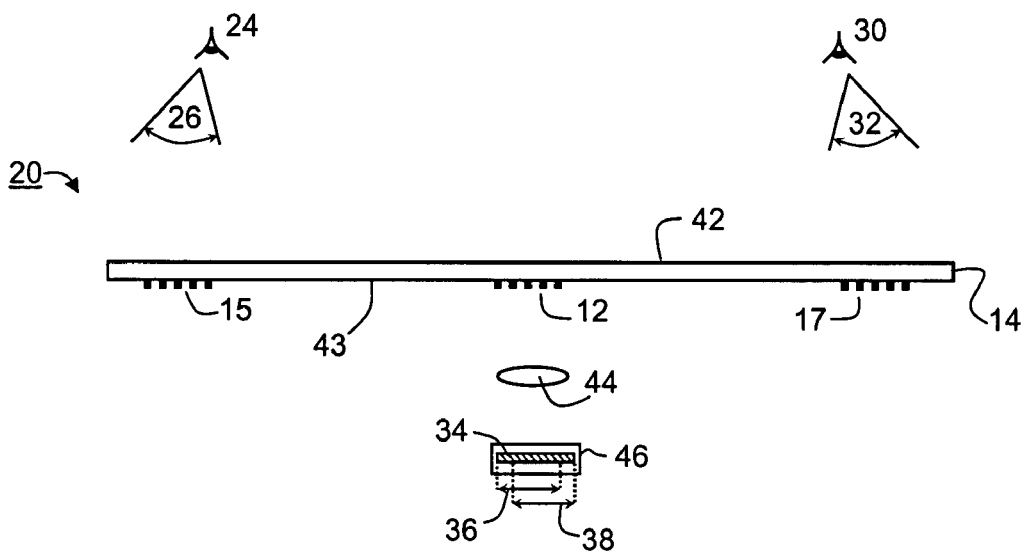

Reference is now made to FIGS. 3*a*-*b* which are schematic illustrations of an isometric view (FIG. 3*a*) and a side view (FIG. 3*b*) of device 20, in a preferred embodiment in which one input optical element and two output optical elements are employed.

Hence, device 20 comprises input optical element 12 and two output optical elements, referred to herein as first output optical element 15 and second output optical element 17. Referring to FIG. 3*b*, first 15 and second 17 output optical elements are formed, together with input optical element 12, on a first side 42 of light-transmissive substrate 14. However, as stated, this need not necessarily be the case, since, for some applications, it may be desired to form the input/output optical elements on any of first 42 or second 43 side of substrate 14, in an appropriate transmissive/reflective combination. According to a preferred embodiment of the present invention first 42 or second 43 side of substrate 14 are substantially parallel.

Element 12 preferably diffracts the incoming light into substrate 14 in a manner such that different portions of the light, corresponding to different portions of the field-of-view, propagate in different directions within substrate 14. In the configuration exemplified in FIGS. 3*a*-*b*, element 12 diffract one portion of the light leftwards, to thereby reach element 15, and another portion of the light rightwards, to thereby reach element 17. Elements 15 and 17 complementarily diffract the respective portions of the light, or portions thereof, out of substrate 14.

According to a preferred embodiment of the present invention device 20 may further comprise a collimator 44, preferably positioned in front of substrate 14. Collimator 44 serves for collimating the input light, if it is not already collimated, prior to impinging on substrate 14. Any collimating element known in the art may be used as collimator 44, for example a converging lens (spherical or non spherical), an arrangement of lenses, a diffractive optical element and the like. The purpose of the collimating procedure is for improving the imaging ability.

In case of a converging lens, a light ray going through a typical converging lens that is normal to the lens and passes through its center, defines the optical axis. The bundle of rays passing through the lens cluster about this axis and may be well imaged by the lens, for example, if the source of the light is located as the focal plane of the lens, the image constituted by the light is projected to infinity.

Other collimating means, e.g., a diffractive optical element, may also provide imaging functionality, although for such means the optical axis is not well defined. The advantage of a converging lens is due to its symmetry about the optical axis, whereas the advantage of a diffractive optical element is due to its compactness.

In the embodiment in which collimator 44 is a diffractive optical element, it may be spaced apart, carried by or formed in substrate 14. One ordinarily skilled in the art will appreciate that in the presently preferred embodiment collimator 44 may be positioned either on the entry surface of substrate 14, as a transmissive diffractive element or on the opposite surface as a reflective diffractive element.

Device 20 may further comprise an image source 46 or any other input light source. Image source 46 may reflect or transmit light. Representative examples for source 46 include, without limitation, a CRT, a flat panel display, e.g., rear-illuminated transmissive or front-illuminated reflective LCD, a miniature illuminated slide, an image produced by other optical device, a fiber bundle guiding image information or an array of organic/inorganic light emitting diodes.

Figure 4A:
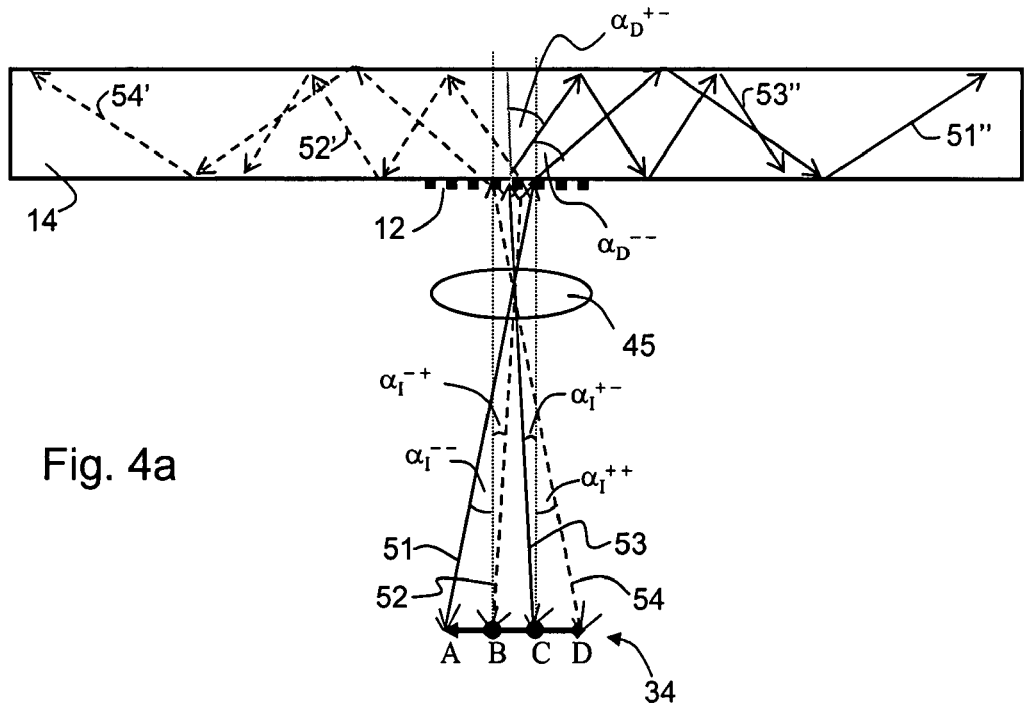
FIGS. 4a-b illustrate wavefront propagation within the device of FIGS. 3a-b, according to a preferred embodiment of the present invention.
Figure 4B:
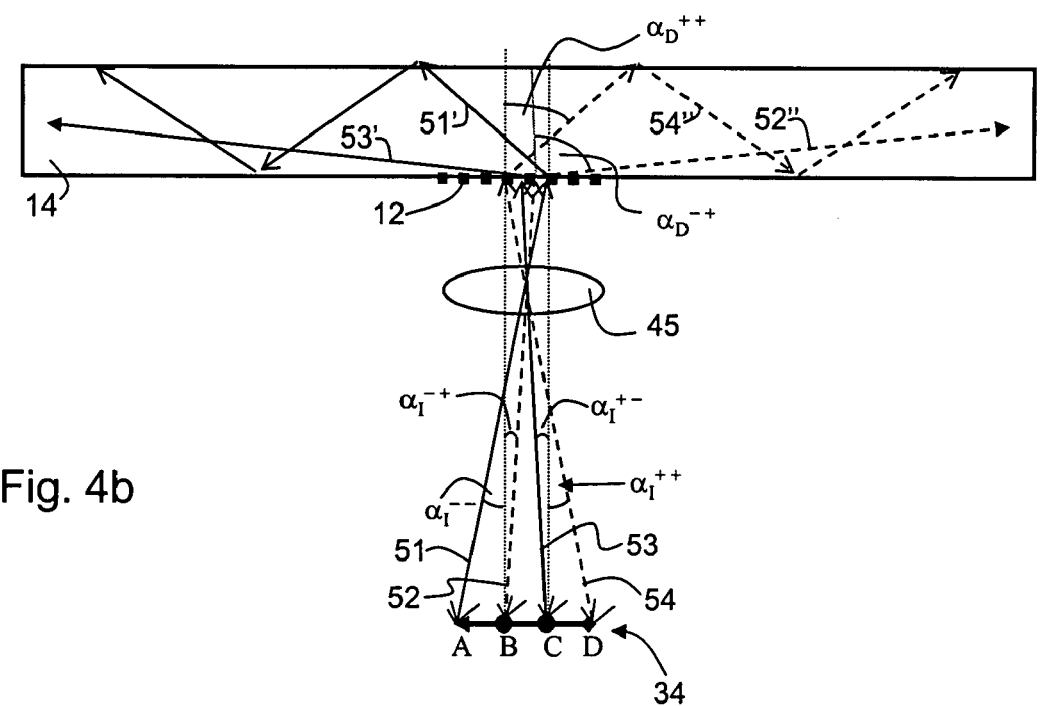

FIGS. 4a-b are schematic illustrations of wavefront propagation within substrate 14, according to preferred embodiments of the present invention. Shown in FIGS. 4a-b are four light rays, 51, 52, 53 and 54, respectively emitted from four points, A, B, C and D, of image 34. The incident angles, relative to the normal to light-transmissive substrate, of rays 51, 52, 53 and 54 are denoted $\alpha_I^{--}$, $\alpha_I^{-+}$, $\alpha_I^{+-}$ and $\alpha_I^{++}$, respectively. As will be appreciated by one of ordinary skill in the art, the first superscript index refer to the position of the respective ray relative to the center of the field-of-view, and the second superscript index refer to the position of the respective ray relative to the normal from which the angle is measured, according to the aforementioned sign convention.

It is to be understood that this sign convention cannot be considered as limiting, and that one ordinarily skilled in the art can easily practice the present invention employing an alternative convention.

Similar notations will be used below for the diffraction angles of the rays, with the subscript D replacing the subscript I. Denoting the superscript indices by a pair i, j, an incident angle is denoted generally as $\alpha_I^{ij}$, and a diffraction angle is denoted generally as $\alpha_D^{ij}$, where ij="--", "-+", "+-" or "--". The relation between each incident angle, $\alpha_I^{ij}$, and its respective diffraction angle, $\alpha_D^{ij}$, is given by Equation 2, above, with the replacements $\alpha_I \rightarrow \alpha_I^{ij}$ and $\alpha_D \rightarrow \alpha_D^{ij}$.

Points A and D represent the left end and the right end of image 34, and points B and C are located between points A and D. Thus, rays 51 and 53 are the leftmost and the rightmost light rays of a first asymmetric field-of-view, corresponding to a portion A-C of image 34, and rays 52 and 54 are the leftmost and the rightmost light rays of a second asymmetric field-of-view corresponding to a portion B-D of image 34. In angular notation, the first and second asymmetric field-of-view are, respectively, [$\alpha_I^{--}$, $\alpha_I^{+-}$] and [$\alpha_I^{-+}$, $\alpha_I^{++}$] (exclusive representations). Note that an overlap field-of-view between the two asymmetric field-of-views is defined between rays 52 and 53, which overlap equals [$\alpha_I^{-+}$, $\alpha_I^{+-}$] and corresponds to an overlap B-C between portions A-C and B-D of image 34.

In the configuration shown in FIGS. 4a-b, a lens 45 magnifies image 34 and collimates the wavefronts emanating therefrom. For example, light rays 51-54 pass through a center of lens 45, impinge on substrate 14 at angles $\alpha_I^{ij}$ and diffracted by input optical element 12 into substrate 14 at angles $\alpha_D^{ij}$. For the purpose of a better understanding of the illustrations in FIGS. 4a-b, only two of the four diffraction angles are shown in each figure, where FIG. 4a shows the diffraction angles of rays 51 and 53 (angles $\alpha_D^{+-}$ and $\alpha_D^{--}$), and FIG. 4a shows the diffraction angles of rays 52 and 54 (angles $\alpha_D^{-+}$ and $\alpha_D^{++}$).

Each diffracted light ray experiences a total internal reflection upon impinging the inner surfaces of substrate 14 if $|\alpha_D^{ij}|$, the absolute value of the diffraction angle is larger than the critical angle, $\alpha_c$. Light rays with $|\alpha_D^{ij}|<\alpha_c$ do not experience a total internal reflection hence escape from substrate 14. Generally, because input optical element 12 diffracts the light both to the left and to the right, a light ray may, in principle, split into two secondary rays each propagating in an opposite direction within substrate 14, provided the diffraction angle of each of the two secondary rays is larger than $\alpha_c$. To ease the understanding of the illustrations in FIGS. 4a-b, secondary rays diffracting leftward and rightward are designated by a single and double prime, respectively.

Reference is now made to FIG. 4a showing a particular and preferred embodiment in which $|\alpha_D^{-+}|=|\alpha_D^{+-}|=\alpha_c$. Shown in FIG. 4a are rightward propagating rays 51" and 53", and leftward propagating rays 52' and 54'. Hence, in this embodiment, element 12 split all light rays between ray 51 and ray 52 into two secondary rays, a left secondary ray, impinging on the inner surface of substrate 14 at an angle which is smaller than $\alpha_c$, and a right secondary ray, impinging on the inner surface of substrate 14 at an angle which is larger than $\alpha_c$. Thus, light rays between ray 51 and ray 52 can only propagate rightward within substrate 14. Similarly, light rays between ray 53 and ray 54 can only propagate leftward. On the other hand, light rays between rays 52 and 53, corresponding to the overlap between the asymmetric field-of-views, propagate in both directions, because element 12 split each such ray into two secondary rays, both impinging the inner surface of substrate 14 at an angle larger than the critical angle, $\alpha_c$.

Thus, light rays of the asymmetrical field-of-view defined between rays 51 and 53 propagate within light-transmissive substrate 14 to thereby reach second output optical element 17 (not shown in FIG. 4a), and light rays of the asymmetrical field-of-view defined between rays 52 and 54 propagate within light-transmissive substrate 14 to thereby reach first output optical element 15 (not shown in FIG. 4a).

In another embodiment, illustrated in FIG. 4b, the light rays at the largest entry angle split into two secondary rays, both with a diffraction angle which is larger than $\alpha_c$, hence do not escape from substrate 14. However, whereas one secondary ray experience a few reflections within substrate 14, and thus successfully reaches its respective output optical element (not shown), the diffraction angle of the other secondary ray is too large for the secondary ray to impinge the other side of substrate 14, so as to properly propagate therein and reach its respective output optical element.

Specifically shown in FIG. 4b are original rays 51, 52, 53 and 54 and secondary rays 51', 52", 53' and 54". Ray 54 splits into two secondary rays, ray 54' (not shown) and ray 54" diffracting leftward and rightward, respectively. However, whereas rightward propagating ray 54" diffracted at an angle $\alpha_D^{++}$ experiences a few reflection within substrate 14 (see FIG. 4b), leftward propagating ray 54' either diffracts at an angle which is too large to successfully reach element 15, or evanesces.

Similarly, ray 52 splits into two secondary rays, 52' (not shown) and 52" diffracting leftward and rightward, respectively. For example, rightward propagating ray 52" diffracts at an angle $\alpha_D^{-+} > \alpha_c$. Both secondary rays diffract at an angle which is larger than $\alpha_c$, experience one or a few reflections within substrate 14 and reach output optical element 15 and 17 respectively (not shown). Supposing that $\alpha_D^{-+}$ is the largest angle for which the diffracted light ray will successfully reach the optical output element 17, all light rays emitted from portion A-B of the image do not reach element 17 and all light rays emitted from portion B-D successfully reach element 17. Similarly, if angle $\alpha_D^{+-}$ is the largest angle (in absolute value) for which the diffracted light ray will successfully reach optical output element 15, then all light rays emitted from portion C-D of the image do not reach element 15 and all light rays emitted from portion A-C successfully reach element 15.

Thus, light rays of the asymmetrical field-of-view defined between rays 51 and 53 propagate within light-transmissive substrate 14 to thereby reach output optical element 15, and light rays of the asymmetrical field-of-view defined between rays 52 and 54 propagate within light-transmissive substrate 14 to thereby reach output optical element 17.

Any of the above embodiments can be successfully implemented by a judicious design of the monocular devices, and, more specifically the input/output optical elements and the light-transmissive substrate.

For example, as stated, the input and output optical elements can be linear diffraction gratings having identical periods and being in a parallel orientation. This embodiment is advantageous because it is angle-preserving. Specifically, the identical periods and parallelism of the linear gratings ensure that the relative orientation between light rays exiting the substrate is similar to their relative orientation before the impingement on the input optical element. Consequently, light rays emanating from a particular point of the overlap portion B-C of image 34, hence reaching both eyes, are parallel to each other. Thus, such light rays can be viewed by both eyes as arriving from the same angle in space. It will be appreciated that with such configuration viewing convergence is easily obtained without eye-strain or any other inconvenience to the viewer, unlike the prior art binocular devices in which relative positioning and/or relative alignment of the optical elements is necessary.

According to a preferred embodiment of the present invention the period, d, of the gratings and/or the refraction index, $n_S$, of the light-transmissive substrate can be selected so to provide the two asymmetrical field-of-views, while ensuring a predetermined overlap therebetween. This can be achieved in more than one way.

Hence, in one embodiment, a ratio between the wavelength, $\lambda$, of the light and the period, d, is larger than or equal a unity:

$$\lambda/d \geq 1. \tag{EQ. 3}$$

This embodiment can be used to provide an optical device operating according to the aforementioned principle in which there is no mixing between light rays of the non-overlapping portions of the field-of-view (see FIG. 4a).

In another embodiment, the ratio $\lambda/d$ is smaller than the refraction index, $n_S$, of the light-transmissive substrate. More specifically, d and $n_S$ can be selected to comply with the following inequality:

$$d > \lambda/(n_S p), \tag{EQ. 4}$$

where p is a predetermined parameter which is smaller than 1.

The value of p is preferably selected so as to ensure operation of the device according to the principle in which some mixing is allowed between light rays of the non-overlapping portions of the field-of-view, as further detailed hereinabove (see FIG. 4b). This can be done for example, by setting $p = \sin(\alpha_D^{MAX})$, where $(\alpha_D^{MAX})$ is a maximal diffraction angle. Because there are generally no theoretical limitations on $\alpha_D^{MAX}$ (apart from a requirement that its absolute value is smaller than 90°), it may be selected according to any practical considerations, such as cost, availability or geometrical limitations which may be imposed by a certain miniaturization necessity. Hence, in one embodiment, further referred to herein as the "at least one hop" embodiment, $\alpha_D^{MAX}$ is selected so as to allow at least one reflection within a predetermined distance x which may vary from about 30 mm to about 80 mm.

For example, for a glass light-transmissive substrate, with an index of refraction of $n_S = 1.5$ and a thickness of 2 mm, a single total internal reflection event of a light having a wavelength of 465 nm within a distance x of 34 mm, corresponds to $\alpha_D^{MAX} = 83.3°$.

In another embodiment, further referred to herein as the "flat" embodiment, $\alpha_D^{MAX}$ is selected so as to reduce the number of reflection events within the light-transmissive substrate, e.g., by imposing a requirement that all the diffraction angles will be sufficiently small, say, below 80°.

In an additional embodiment, particularly applicable to those situations in the industry in which the refraction index of the light-transmissive substrate is already known (for example when device 20 is intended to operate synchronically with a given device which includes a specific light-transmissive substrate), Equation 4 may be inverted to obtain the value of p hence also the value of $\alpha_D^{MAX} = \sin^{-1} p$.

As stated, device 20 can transmit light having a plurality of wavelengths. According to a preferred embodiment of the present invention, for a multicolor image the gratings period is preferably selected to comply with Equation 3, for the shortest wavelength, and with Equation 4, for the longest wavelength. Specifically:

$$\lambda_R/(n_S p) \leq d \leq \lambda_B, \tag{EQ. 5}$$

where $\lambda_B$ and $\lambda_R$ are, respectively, the shortest and longest wavelengths of the multicolor spectrum. Note that it follows from Equation 5 that the index of refraction of the substrate should satisfy, under these conditions, $n_S p \geq \lambda_R/\lambda_B$.

The grating period can also be smaller than the sum $\lambda_B + \lambda_R$, for example:

$$d = \frac{\lambda_B + \lambda_R}{n_S \sin(\alpha_D^{MAX}) + n_A}. \tag{EQ. 6}$$

According to another aspect of the present invention there is provided a method of transmitting light striking a light-transmissive substrate at a plurality of angles defining a field-of-view. The method comprises the following method steps in which in a first step the light is diffracted into the light-transmissive substrate in a manner such that different portions of the light, corresponding to different portions of the field-of-view, propagate in different directions within the substrate. In a second step of the method different portions of the light are complementarily diffracted out of the substrate, so as to substantially preserve the field-of-view.

The method can be used to transmit an image into a first eye and a second eye of a user. For example, the image can be first diffracted into the substrate, e.g., using an input optical element. Once trapped within the substrate, a first portion of the image (e.g., portion A-C) can be diffracted into the first eye of the user, and a second portion (e.g., portion B-D) can be diffracted into the second eye of the user. Optionally and preferably, the image portions can be diffracted using output optical element as further detailed hereinabove.

According to a preferred embodiment of the present invention the linear grating of each of the optical elements can be recorded by means of holographic techniques, by means of computer-generated masks and lithographic techniques, by direct writing techniques, by embossing or etching or by any other procedure known in the art.

It should be understood that the light-transmissive substrate can be manufactured from any material which enables transmission of light therethrough, such as, but not limited to, glass or transparent polymer in the case of visible light. In any case, the index of refraction of the light-transmissive substrate material should be larger than the index of refraction of air, or any other material bounding the light-transmissive substrates.

The preferred technical details of any embodiment of the invention are as follows. A thickness, h, of the light-transmissive substrate is between about 0.5 mm and about 5 mm, more preferably from about 2 mm to about 3 mm. For a multicolor image, h is preferably selected to allow simultaneous propagation of plurality of wavelengths, e.g., $h > 10\ \lambda_R$. The width/length of the light-transmissive substrate is preferably from about 10 mm to about 100 mm. A typical width/length of the input and output optical elements ranges for different optical applications such as the near eye display application described in U.S. Pat. No. 5,966,223 from about 5 mm to about 20 mm. The preferred field-of-view is of at least 20 degrees, more preferably at least 30 degrees most preferably at least 40 degrees, in inclusive representation. The preferred spectrum of light, in a multi-color configuration, spans at least 100 nm. More specifically, the shortest wavelength, $\lambda_B$, generally corresponds to a blue light having a typical wavelength of between about 400 to about 500 nm, the longest wavelength, $\lambda_R$, generally corresponds to a red light having a typical wavelength of between about 600 to about 700 nm.

Additional objects, advantages and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions illustrate the invention in a non limiting fashion.

Example 1

Monochromatic Configuration for Blue Light

This example demonstrate the attainable field-of-view when Equation 3 is employed for a wavelength $\lambda=465$ nm (blue light), and indices of refraction $n_S=1.5$ for the light-transmissive substrate and $n_A=1.0$ for air, corresponding to a the critical angle is 41.8°.

For a grating period d=430 nm ($\lambda/d > 1$, see Equation 3), the maximal (negative by sign) angle at which total internal reflection can be occur is 4.67°. In the notation of FIG. 4a, $\alpha_I^{+-} = -4.67°$ (see ray 53). However, the positive incidence angle (see ray 51 of FIG. 4a) can be as large as $\alpha_I^{--} = 23.32°$, in which case the diffraction angle is about 80°, which comply with the total internal reflection condition. Thus, in this configuration, each of the attainable asymmetric field-of-views is of $|\alpha_I^{++}| + \alpha_I^{--} \approx 28°$, resulting in a symmetric combined field-of-view of $2 \times \alpha_I^{--} \approx 47°$.

Example 2

Monochromatic Configuration for Red Light

This example demonstrate the attainable field-of-view when Equation 4 is employed for a wavelength $\lambda=620$ nm (red light) and the refraction indices of Example 1, corresponding to the same critical angle ($\alpha_c=41.8°$).

Imposing the "flat" requirement and a maximal diffraction angle of 80°, one can calculate that for $\lambda=620$ nm the grating period of Example 1 d=430 nm complies with Equation 4.

The maximal (positive by sign) angle at which total internal reflection can occur is 2.03°. In the notation of FIG. 4b, $\alpha_I^{-+} = +2.03°$ (see ray 52). The negative incidence angle (see ray 54 of FIG. 4b) is limited by the requirement $|\alpha_D^{++}| < \alpha_c$, which corresponds to $\alpha_I^{++} = -26.22°$. Thus, in this configuration, each of the attainable asymmetric field-of-views is of about 28°, resulting in a symmetric combined field-of-view of about 52°.

Example 3

Multicolor Configuration

This example demonstrate the attainable field-of-view when Equation 6 is employed for a spectrum in which the shortest wavelength is $\lambda_B=465$ nm (blue light) and the longest wavelength is $\lambda_R=620$ nm (red light). The refraction indices, the critical angle and the maximal diffraction angle are the same as in Example 2.

Using Equation 6, one obtains d=438 nm. Further, using Equation 2 one can calculate the asymmetric field-of-views of the blue and red lights.

Hence for the blue light the first asymmetric field-of-view is [−3.54°, 24.56°], the second asymmetric field-of-view is [−24.56°, 3.54°], resulting in a combined field-of-view of about 49°.

For the red light, the calculation yield an opposite situation in which the first asymmetric field-of-view is [−24.56°, 3.54°], and the second asymmetric field-of-view is [−3.54°, 24.56°], still resulting in a combined field-of-view of about 49°.

If a third, intermediate wavelength is present, say 525 nm (green light), then the first green asymmetric field-of-view is [−11.46°, 16.18°], and the second green asymmetric field-of-view is [−16.18°, 11.46°], resulting in a symmetric combined field-of-view of about 32°. Thus, the overlap between the individual wavelength-dependent field-of-views is of 32°. It will be appreciated that selecting a different period for the gratings may result in a larger overlapping field of view.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A binocular device, comprising:
    (a) an input display source for transmitting light constituting a multicolor image having a spectrum which comprises a first sub-spectrum and a second sub-spectrum being different from said first sub-spectrum; and
    (b) a light-transmissive substrate formed with an input diffraction grating, a left eye output diffraction grating and a right eye output diffraction grating,
    said input diffraction grating being positioned and constituted to provide:
        (i) for said first sub-spectrum, the left eye output diffraction grating with a view of a portion of the image other than a left peripheral portion of the image, and the right eye output diffraction grating with a view of a portion of the image other than a right peripheral portion of the image, wherein said portion of the image other than said left peripheral portion incidents on said substrate at a first range of incident angles and said portion of the image other than said right peripheral portion incidents on said substrate at a second range of incident angles, said second range of angles being different from said first range of angles; and
        (ii) for said second sub-spectrum, the left eye output diffraction grating with a view of a portion of the image other than a right peripheral portion of the image, and the right eye output diffraction grating with a view of a portion of the image other than a left peripheral portion of the image, wherein said portion of the image other than said right peripheral portion incidents on said substrate at a third range of incident angles and said portion of the image other than said left peripheral portion incidents on said substrate at a fourth range of incident angles, said third range of angles being different from said fourth range of angles.

2. The device of claim 1, wherein said input diffraction grating, said left eye output diffraction grating and said right eye output diffraction grating are designed and constructed such that, for each sub-spectrum, each light ray, emitted by or reflected from an overlapping portion defined between said left and said right peripheral portions, bifurcates within the device and exits said light-transmissive substrate in a form of two substantially parallel light rays, respectively propagating into the left and right eyes.

3. The device of claim 1, wherein said input diffraction grating, said left eye output diffraction grating and said right eye output diffraction grating, have substantially identical periods.

4. The device of claim 3, wherein said input diffraction grating, said left eye output diffraction grating and said right eye output diffraction grating, are substantially parallel.

5. The device of claim 1, wherein each of said input diffraction grating, said left eye output diffraction grating and said right eye output diffraction grating is independently a linear diffraction grating.

6. The device of claim 5, wherein a period characterizing said linear diffraction gratings is larger than $\lambda_R/(n_s p)$ and smaller than $\lambda_B$, said $n_s$ being a refraction index of said light-transmissive substrate, said p being a predetermined parameter, said $\lambda_R$ being a longest wavelength of said spectrum and said $\lambda_B$ being a shortest wavelength of said spectrum.

7. The device of claim 6, wherein a thickness of said light-transmissive substrate is larger than $10\lambda_R$.

8. The device of claim 5, wherein said linear diffraction grating is selected from the group consisting of reflection linear diffraction grating and transmission linear diffraction grating.

9. The device of claim 1, further comprising a lens system for projecting said image to infinity, wherein said lens system is positioned on the light path between said input display source and said input diffraction grating.

10. The device of claim 9, wherein said lens system comprises a converging lens.

11. The device of claim 10, wherein said converging lens is a spherical converging lens.

12. The device of claim 10, wherein said converging lens is a non-spherical converging lens.

13. The device of claim 9, wherein said lens system comprises an arrangement of lenses.

14. The device of claim 1, wherein said linear diffraction grating is recorded by a procedure selected from a group consisting of holography, computer-generated masks, lithography, embossing, etching and direct writing.

15. A method comprising:
    (a) transmitting light constituting a multicolor image of an input display source, said light having a spectrum which comprises a first sub-spectrum and a second sub-spectrum being different from said first sub-spectrum;
    (b) for said first sub-spectrum,
    diffracting a portion of the image other than a left peripheral portion of the image to propagate via total internal reflection within a light-transmissive substrate in a direction of a left eye output diffraction grating for exiting of said portion to a left eye of a user, and
    diffracting a portion of the image other than a right peripheral portion of the image to propagate via total internal reflection within a light-transmissive substrate in a direction of a right eye output diffraction grating, for exiting of said portion to a right eye of a user;
    wherein said portion of the image other than said left peripheral portion incidents on said substrate at a first range of incident angles and said portion of the image other than said right peripheral portion incidents on said substrate at a second range of incident angles, said second range of angles being different from said first range of angles;
    (c) for said second sub-spectrum,
    diffracting a portion of the image other than a right peripheral portion of the image to propagate via total internal reflection within a said substrate in a direction of said left eye output diffraction grating, for exiting of said portion to said left eye, and
    diffracting a portion of the image other than a left peripheral portion of the image to propagate via total internal reflection within said substrate in a direction of said right eye output diffraction grating for exiting of said portion to said right eye;

wherein said portion of the image other than said right peripheral portion incidents on said substrate at a third range of incident angles and said portion of the image other than said left peripheral portion incidents on said substrate at a fourth range of incident angles, said third range of angles being different from said fourth range of angles.

16. The method of claim 15, wherein (b)-(e) are each independently executed using a linear diffraction grating.

17. The method of claim 16, wherein a period characterizing said linear diffraction gratings is larger than $\lambda_R/(n_s p)$ and smaller than $\lambda_B$, said $n_s$ being a refraction index of said light-transmissive substrate, said p being a predetermined parameter, said $\lambda_R$ being a longest wavelength of said spectrum and said $\lambda_B$ being a shortest wavelength of said spectrum.

18. The method of claim 15, wherein (b) and (c) comprise, for each sub-spectrum, bifurcating each light ray, emitted by or reflected from an overlapping portion defined between said left and said right peripheral portions, into a bifurcated light ray, and (d) and (e) respectively comprises diffracting said bifurcated light ray out of said light-transmissive substrate in a form of two substantially parallel light rays propagating into the left and the right eyes.

19. The method of claim 15, further comprising, prior to (b) and (c), projecting the image to infinity using a lens system.

20. The method of claim 19, wherein said lens system comprises a converging lens.

21. The method of claim 20, wherein said converging lens is a spherical converging lens.

22. The method of claim 20, wherein said converging lens is a non-spherical converging lens.

23. The method of claim 19, wherein said lens system comprises an arrangement of lenses.

24. A binocular device for transmitting light from input display source into a first eye and a second eye of a user, the light constituting a multicolor image characterized by a spectrum which comprises a first sub-spectrum and a second sub-spectrum being different from said first sub-spectrum, the binocular device comprising:
  (a) a lens system that projects the multicolor image to infinity and transmits the light constituting the multicolor image
  (b) a light-transmissive substrate formed with an input diffraction grating, a left eye output diffraction grating and a right eye output diffraction grating;
  said input diffraction grating being positioned and constituted to provide:
  (i) for said first sub-spectrum, the left eye output diffraction grating with a view of a portion of the image other than a left peripheral portion of the image, and the right eye output diffraction grating with a view of a portion of the image other than a right peripheral portion of the image, wherein said portion of the image other than said left peripheral portion incidents on said substrate at a first range of incident angles and said portion of the image other than said right peripheral portion incidents on said substrate at a second range of incident angles, said second range of angles being different from said first range of angles; and
  (ii) for said second sub-spectrum, the left eye output diffraction grating with a view of a portion of the image other than a right peripheral portion of the image, and the right eye output diffraction grating with a view of a portion of the image other than a left peripheral portion of the image, wherein said portion of the image other than said right peripheral portion incidents on said substrate at a third range of incident angles and said portion of the image other than said left peripheral portion incidents on said substrate at a fourth range of incident angles, said third range of angles being different from said fourth range of angles.

* * * * *